United States Patent Office 3,008,789
Patented Nov. 14, 1961

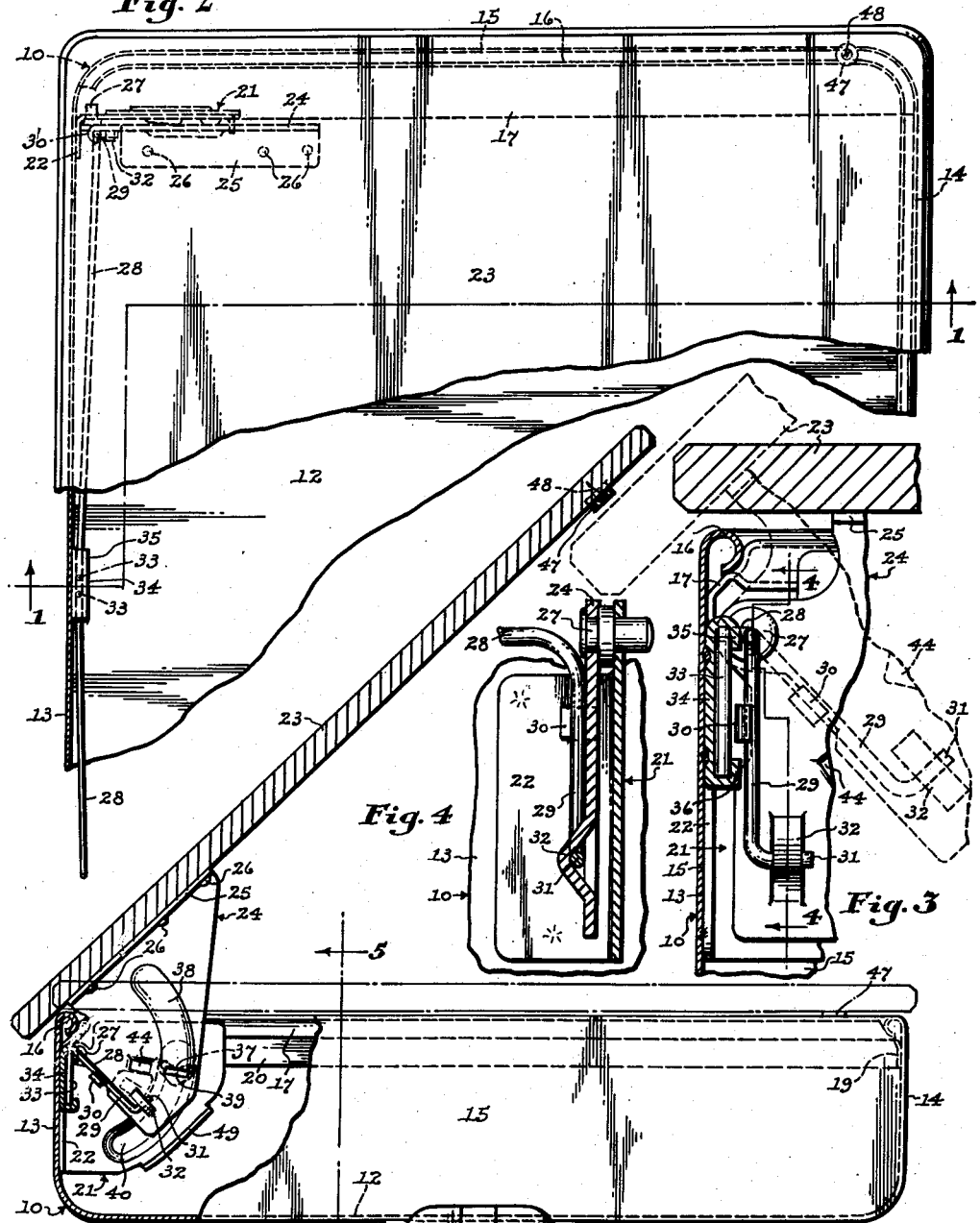

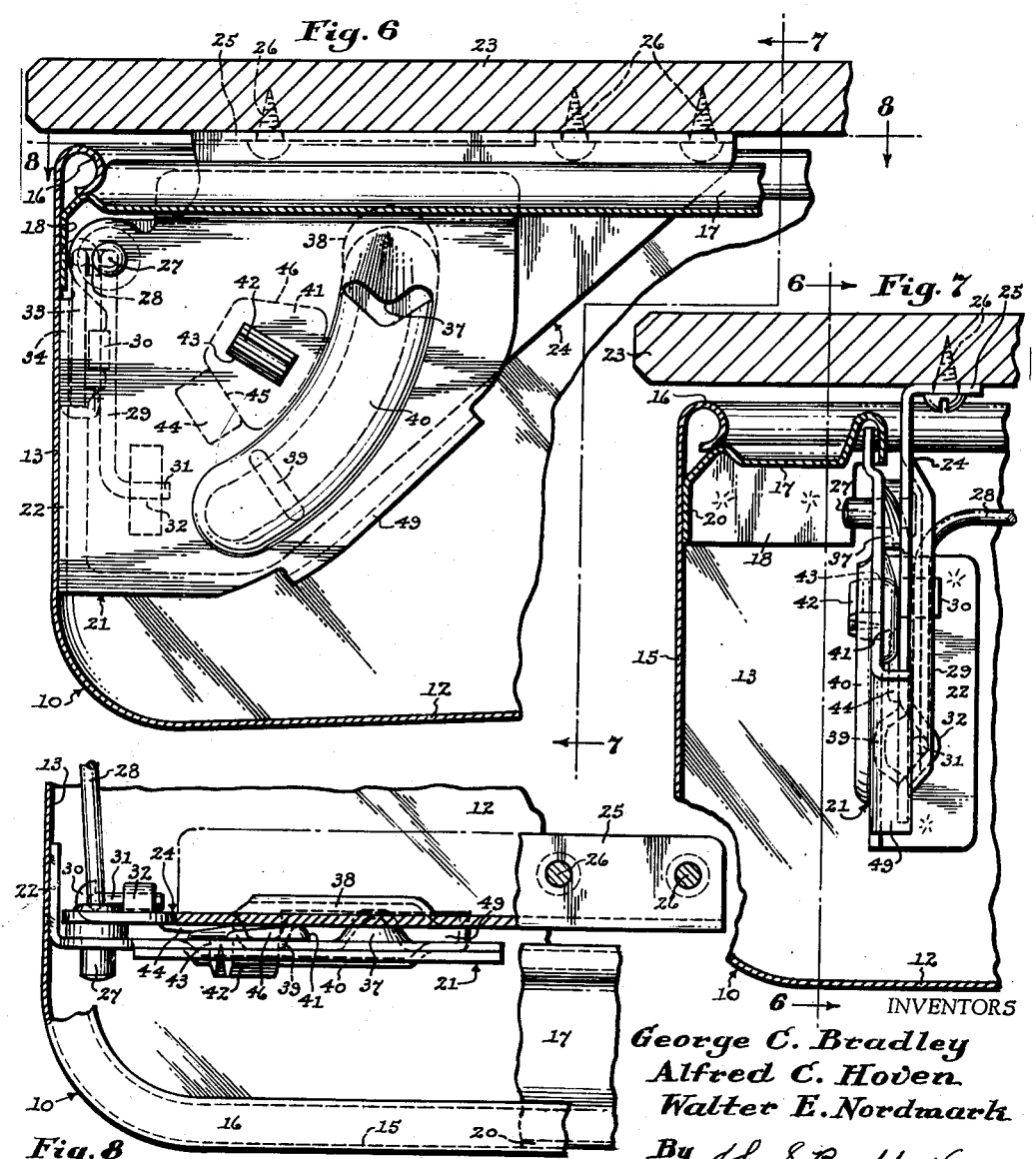

3,008,789
LIFTING LID DESK BOX
George C. Bradley, Alfred C. Hoven, and Walter E. Nordmark, Grand Rapids, Mich., assignors to American Seating Company, Grand Rapids, Mich., a corporation of New Jersey
Filed Feb. 5, 1959, Ser. No. 791,356
2 Claims. (Cl. 312—316)

The present invention relates to desks and tables, or the like.

The primary objects of the invention are to provide an improved lifting lid box for desks and tables of the type generally provided for the use of individual students in a classroom; to provide such a lifting lid box in which the lid or cover is pivotally connected to the upper front wall of the box so as to be swingable between a lowered position closing the box and serving as a work surface, and a raised, rearwardly-upwardly inclined position giving access to the box; to provide such a box in which the cover therefor is mounted so that it moves easily and quietly between lowered and raised positions, and so that it will automatically remain in any swung position thus permitting the user of the structure to employ both hands when depositing books and other articles into the box, or removing such articles; to provide counter-balancing means for the cover in the form of torsion spring wires which normally urge the cover toward its raised position, thus making it easier to lift the cover; and in general to provide such a desk box which is quiet and smooth in operation, reasonably economical in manufacture and attractive in appearance.

An illustrative embodiment of the invention is shown in the accompanying drawing, wherein:

FIGURE 1 is a side view of the new desk box shown partly in side elevation and partly in section taken on line 1—1 of FIGURE 2, the cover for the box being shown in open or raised position in full lines and in closed or lowered position in broken lines, and the supporting pedestal for the box being shown fragmentarily;

FIGURE 2 is a fragmentary top plan view of portions of the box;

FIGURE 3 is a fragmentary vertical sectional view of parts of the box and showing the hinge mechanism at the right hand side of the box as viewed in FIGURE 5, the plane of section being indicated by the line 3—3 of FIGURE 5;

FIGURE 4 is a fragmentary vertical sectional view of parts thereof taken on line 4—4 of FIGURE 3;

FIGURE 5 is a vertical sectional view of the box taken on line 5—5 of FIGURE 1, looking forwardly in the box;

FIGURE 6 is a fragmentary vertical sectional view, taken on lines 6—6 of FIGURES 5 and 7, showing the hinge mechanism at the left hand side of the box as viewed in FIGURE 5;

FIGURE 7 is a fragmentary vertical sectional view thereof taken on line 7—7 of FIGURE 6;

FIGURE 8 is a fragmentary horizontal sectional view thereof taken on line 8—8 of FIGURE 6; and FIGURE 9 is a perspective view of one of the torsion spring wires of the structure prior to its assembly, the wire shown in this view being the one for the right hand side of the box.

The hinge mechanisms at the opposite sides of the box are identical except that they are made in right and left mechanisms, the several parts of the two mechanisms being thus oppositely formed and assembled. For clarity of illustration, FIGURES 1–4 show the right hand hinge mechanism while FIGURES 6–8 show the left hand hinge mechanism. Thus the views face in the same direction, FIGURES 1 and 3 showing the inside of the right hand hinge mechanism while FIGURE 6 shows the outside of the left hand hinge mechanism. Corresponding parts of the two mechanisms are identified by the same numerals in the several views.

Referring now in detail to the drawings, FIGURE 1 shows an upwardly opening desk box 10 mounted by suitable means on a supporting pedestal 11 here shown fragmentarily. The box 10 comprises a bottom 12, a front wall 13 and rear wall 14, and side walls 15 all integrally formed from a single sheet of metal. The upper peripheral marginal edge 16 of the box is curled inwardly, downwardly and then outwardly to give a smooth, finished appearance to the box. Pencil trays 17 are mounted at the opposite sides of the box, the trays being provided with depending flanges 18, 19 and 20 secured as by welding to the front wall 13, rear wall 14 and adjacent side wall 15 respectively of the box. Vertically disposed lower hinge leaves 21 have inwardly extending front flanges 22 secured as by welding to the front wall 13 of the box, these lower hinge leaves extending rearwardly in the box at opposite sides thereof. The details of these lower hinge leaves 21 will hereinafter be fully described.

The lid or cover 23 for the box may desirably be made of wood or laminated plastic. Vertically disposed upper hinge leaves 24 have inwardly extending top flanges 25, and screws 26 passing through apertures in these top flanges 25 and into the cover 23 secure the upper hinge leaves 24 to the cover. The upper hinge leaves 24 depend from the forward underside of the cover into the box 10 alongside and slightly inwardly from the lower hinge leaves 21. A pivotal connection is provided between each lower hinge leaf 21 and the adjacent upper hinge leaf 24 and comprises a pivot pin 27 having a middle portion of enlarged diameter disposed between the leaves 21 and 24, an inner portion extending through and riveted to the upper hinge leaf 24 and an outer portion turnably bearing in an opening through the lower hinge leaf 21. These pivotal connections are located in the upper forward portions of the pairs of adjacent hinge leaves 21 and 24, and it will be seen that these connections provide for swinging movement of the cover 23 between a lowered horizontal position closing the box and a raised, rearwardly-upwardly inclined position giving access to the box from the rear.

The weight of the cover 23 is counterbalanced to facilitate manual lifting of the cover to raised positions, and this is accomplished by means of a pair of torsion spring wires 28 extending alongside the inner face of the front wall 13 of the box and on opposite sides of the box. The outer end portions 29 of these torsion spring wires 28 are bent downwardly at right angles so as to engage behind tongues 30 formed in the front edges of the upper hinge leaves 24, and the lower extremities 31 of the end portions 29 of the wires are again bent rearwardly at right angles so as to engage in sockets 32 formed in the upper leaves 24.

Prior to assembly of the torsion spring wires 28, their inner ends 33 are bent forwardly at right angles as illustrated in FIGURE 9 which shows the wire at the right hand side of the box as originally bent. After the outer ends of the wires 28 have been assembled to the upper hinge leaves 24, the inner ends 33 of the wires are twisted downwardly as indicated by the arrow in FIGURE 9 and these inner ends 33 are then inserted into a bracket 34 welded to the front wall 13 of the box in the center thereof (see FIGURES 2, 3 and 5). The bracket 34 has an upper retaining flange 35 and a lower retaining flange 36 which maintain the inner ends 33 of the wires 28 securely connected to the box. It will be seen that the torsion spring wires 33 are thus preloaded in a direction for normally urging the cover toward its raised position, and the springs are preloaded to a degree sufficient to counterbalance the weight of the cover. The diameter of the wire used for these torsion springs 33 is a factor which must be calculated in order to arrive at the correct preloading of the springs in relation to the weight of the cover. And while but a single torsion spring wire could be made to do the work, a better and more even counterbalance can be attained by the use of two springs as shown.

Stop means are provided for limiting the raising movement of the cover to a rearward-upward inclination of approximately 50 degrees. These means comprise stops 37 (see FIGURES 6–8) on the lower hinge leaves 21, which extend inwardly toward the upper hinge leaves 24 and which are accommodated in inwardly formed arcuate raceways 38 provided in the upper leaves 24, during these upper leaves' turning movements. Lugs 39 extend outwardly from the upper hinge leaves 24 and move during these upper leaves' movements in outwardly formed arcuate raceways 40 provided in the lower hinge leaves 21. When the lugs 39 move upwardly far enough to contact the stops 37, the cover is positively stopped in its raising movement at the desired predetermined angle.

Molded plastic friction members 41 are interposed between the pairs of adjacent upper and lower hinge leaves, 24 and 21. These friction members 41 are secured to the fixed lower hinge leaves 21 by means of compressible rectangular block portions 42 molded thereon, which are sprung through rectangular openings 43 in the lower hinge members 21. The inner surfaces of the friction members 41 adjacent the upper hinge leaves 24 are slightly wedge shaped as best seen in FIGURES 7 and 8. Outwardly projecting embosses 44 are provided on the upper hinge leaves 24 and these embosses are also slightly wedge shaped as shown.

When the cover 23 is in its lowered horizontal position, the embosses 44 engage behind the lower forward edges 45 of the friction members 41, positively but releasably securing the cover in its closed position against the force of the torsion springs 28. A slight lifting of the cover 23 at its rear edge causes the embosses 44 to ride up on the plastic friction members 41. This action forces the hinge members 21, 24 slightly apart at a rearwardly divergent angle, but the wedge shaped formation of the friction members 41 and embosses 44 insures surface-to-surface contact of these members.

Due to the counterbalancing of the cover 23 by the torsion spring wires 28, the cover moves with a feathery lightness during its raising and lowering movements. However, the cover will remain at any angle at which it is left due to the frictional engagement of the embosses 44 with the friction members 41. These friction members 41 are preferably made of a molded plastic such as nylon or polyethylene to insure smoothness and quietness of operation and long wear. When the cover is in its extreme raised position the embosses 44 engage behind the opposite or upper rearward edges 46 of the friction members 41 thus to positively but releasably secure the cover in its extreme raised position.

Bumpers 47 of rubber or other resilient material are secured by means of screws 48 to the rearward underside of the cover 23 and are adapted to contact the inwardly curled rim 16 of the box 10 to insure quiet closing of the cover.

The lower rearward edges of the lower hinge leaves 21 are desirably provided with guard flanges 49 which extend inwardly beneath the upper hinge leaves 24 so that when the box is open, books and other articles cannot be placed directly in the path of the upper hinge leaves and become damaged when the cover is lowered.

It will thus be seen that the invention provides an improved lifting lid box for a desk or the like which is convenient and easy to use, and is smooth, quiet and efficient in operation. While but one specific embodiment of the invention has been herein shown and described it will be understood that numerous details may be altered or omitted without departing from the spirit of the invention as defined by the following claims.

We claim:
1. In a desk structure: an upwardly opening box having a bottom, a front wall and side walls, a pair of vertically disposed lower hinge leaves mounted on said front wall and extending rearwardly in the box alongside the side walls respectively; a cover for the box; a vertically disposed upper hinge leaf mounted at each side of the forward underside of the cover and depending therefrom alongside the adjacent lower hinge leaf; pivotal connections between the pairs of adjacent hinge leaves near the upper front portions thereof whereby said cover is swingable between a lowered horizontal position closing the box and a raised rearwardly-upwardly inclined position giving access to the box from the rear; a pair of torsion spring wires each having one end thereof connected to an upper hinge leaf and having the other end connected to the box near the middle of the inside of the front wall of the box, said torsion spring wires being mounted independently of said pivotal connections and being preloaded in a direction whereby they normally urge the cover toward its raised position; stops on the lower hinge leaves extending toward the upper hinge leaves respectively; lugs on the upper hinge leaves extending toward the lower hinge leaves respectively and adapted to contact said stops to limit the raising movement of the cover; molded plastic friction members secured to the lower hinge leaves and extending toward the upper hinge leaves respectively; and embosses on the upper hinge leaves adapted to frictionally engage said friction members during raising and lowering movements of the cover so as to frictionally maintain the cover in any turned position.

2. A desk structure according to claim 1 in which said embosses engage behind opposite edges of said friction members to positively but releasably secure the cover in either its extreme lowered position or its extreme raised position.

References Cited in the file of this patent
UNITED STATES PATENTS

| | | |
|---|---|---|
| 822,555 | Rogers | June 5, 1906 |
| 1,987,060 | Hammond | Jan. 8, 1935 |
| 2,213,319 | Lickteig | Sept. 3, 1940 |
| 2,602,957 | Anderson | July 15, 1952 |
| 2,700,139 | Jewell | Jan. 18, 1955 |
| 2,775,781 | Morgan | Jan. 1, 1957 |
| 2,812,537 | Galla | Nov. 12, 1957 |
| 2,831,208 | Mohr | Apr. 22, 1958 |
| 2,871,505 | Clark | Feb. 3, 1959 |